United States Patent [19]

Sekiguchi et al.

[11] Patent Number: 4,744,451
[45] Date of Patent: May 17, 1988

[54] SUCCESSIVE COMPONENT DELIVERY CHUTE

[75] Inventors: Moriaki Sekiguchi; Hidefumi Toda, both of Tokyo, Japan

[73] Assignee: Ando Electric Co., Ltd., Tokyo, Japan

[21] Appl. No.: 891,718

[22] Filed: Jul. 29, 1986

[30] Foreign Application Priority Data

Jul. 31, 1985 [JP] Japan .............................. 60-117975[U]
Jul. 31, 1985 [JP] Japan .............................. 60-117976[U]
Jul. 31, 1985 [JP] Japan .............................. 60-117977[U]

[51] Int. Cl.⁴ .............................................. B65G 11/00
[52] U.S. Cl. ...................................................... 193/40
[58] Field of Search ............ 193/40, 35 G, 36, 35 A, 193/32; 221/298, 251

[56] References Cited

U.S. PATENT DOCUMENTS

| 4,377,368 | 3/1983 | Koch | 221/298 |
| 4,402,425 | 9/1983 | von Schuckmann | 221/298 |
| 4,457,194 | 7/1984 | Molly | 221/298 |
| 4,501,380 | 2/1985 | Welch | 221/298 |

Primary Examiner—Joseph F. Peters, Jr.
Assistant Examiner—L. M. Fiorito
Attorney, Agent, or Firm—Panitch Schwarze Jacobs and Nadel

[57] ABSTRACT

A successive component delivery chute comprises a slanted slide with a stepped section and a pair of stoppers provided along said section which are adapted to come into and out of the way of components to be delivered in a predetermined sequence to deliver a series of components one after another. A smooth delivery is effect with this arrangement.

2 Claims, 3 Drawing Sheets

4,744,451

SUCCESSIVE COMPONENT DELIVERY CHUTE

SUMMARY OF THE INVENTION

This invention relates to a successive component delivery chute. More particularly, it is concerned with a delivery chute for integrated circuits or other electronic elements or components which are arranged in a row after the manufacture and are successively sent out, one by one, for subsequent measurements of their characteristic values.

It is an object of the present invention to provide a successive component delivery chute of simplified construction which comprises an inclined slide with a step formed to define two sections of high and low floor levels and two stoppers movable upward and downward to control the flow of components that come down in succession on the slide, in order to deliver them one by one.

Another object of the invention is to provide a successive component delivery chute with an improved upstream stopper which, regardless of the vertical motions of the stoppers, ensures the flow of the components in a constant sliding direction.

Yet another object of the invention is to provide a successive component delivery chute using two stoppers, with the downstream stopper being easily adjustable in location to handle components in lots of different lengths.

DESCRIPTION OF THE PREFERRED EMBODIMENTS

Figure 1:
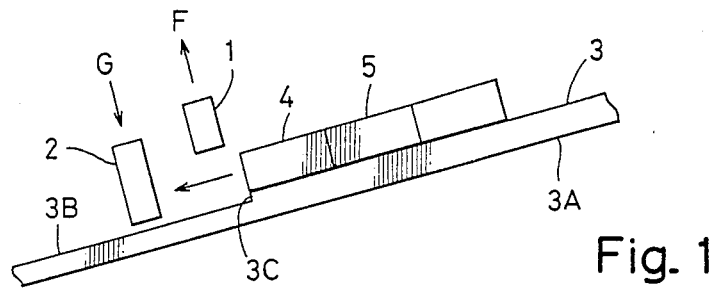
FIG. 1 is a schematic view showing the general construction of an embodiment of the invention.

Referring first to FIG. 1, there is shown the general construction of the first embodiment of the invention.

Figure 2:
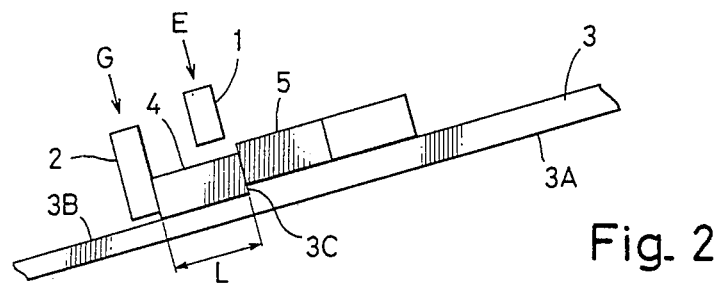
FIGS. 2 to 4 are sequential views explanatory of the operation of the embodiment shown in FIG. 1.

In FIG. 1, 1 and 2 are stoppers, 3 is a slide, and 4 and 5 are components being handled. Components 4, 5, and so forth have the same thickness or height, component 4 being the first one and component 5 the next.

Slide 3 consists of a thick, or high-floor, section 3A and a thin, or low-floor, section 3B bordered by a step 3C, which provides a difference in level, or height, less than the height of component 4.

Stopper 1 is located above slide 3, slightly downstream, or toward section 3B, away from step 3C and is vertically movable between a lower position E and an upper position F.

Lower position E represents the lower limit for the vertical motion of stopper 1 where it stops a sufficient distance above slide section 3B to allow component 4 to slide down clear of the stopper. With stopper 1 in this position, component 4 that has slid down on section 3A is brought to a stop by hitting against one side of the stopper.

Upper position F is the upper limit for stopper 1, where the stopper is kept still above the top of component 4.

Stopper 2 also is held above the section 3B of slide 3 but a distance equal to the length L of component 4 downstream from step 3C. It is movable too between a lower position G and an upper position H.

Lower position G is the lower limit for the motion of stopper 2, where it stops and causes component 4 on slide section 3B to stop upon contact with the stopper. Upper position H is the upper limit for stopper 2 to stop above the top of component 4 on section 3B.

The operation of the successive component delivery chute embodying the invention will now be explained in conjunction with FIGS. 1 to 4.

FIG. 1 shows stopper 1 in its upper position F and stopper 2 in its lower position G.

In the state shown, components 4 and 5 slide down gravitationally toward slide section 3B.

Instead of by gravity, components 4 and 5 may be moved pneumatically or by other drive or forced feed means such as ratchet mechanism.

FIG. 2 illustrates an advanced stage in which component 4 in FIG. 1 has come to a stop in contact with stopper 2, and component 5 at rest in contact with component 4, while stopper 1 is coming down to its lower position.

Figure 3:
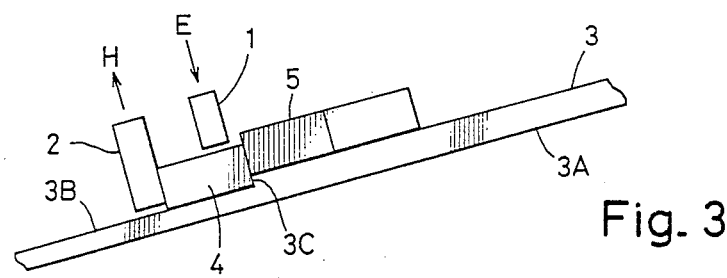

FIG. 3 shows stopper 2 moving upward from the position in FIG. 2 to its upper position H.

Figure 4:
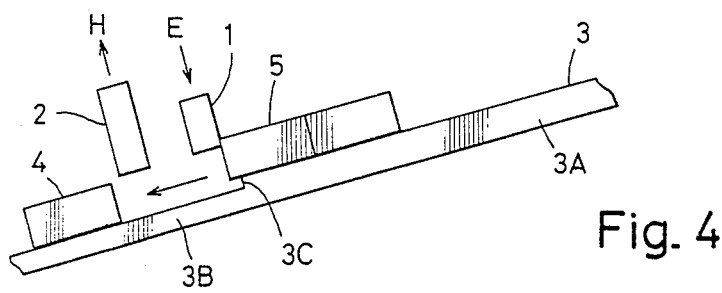

In FIG. 4, stopper 2 has ascended from the position in FIG. 3 to its upper position H, allowing component 4 to slide down to the left of stopper 2, whereas component 5 is kept still by one side of stopper 1.

When stopper 1 in FIG. 4 ascends to its upper position F and stopper 2 descends to its lower position G, the condition of FIG. 1 is reattained.

As is obvious from FIGS. 1 through 4, components 4, 5, and so forth being discharged in a row are sent out, one by one, by the slide sections 3A, 3B coacting with the alternate vertical motions of stoppers 1, 2.

As described, this embodiment uses a slide stepped midway and inclined and two stoppers which perform alternate vertical motions to control the handling of components that slide down in succession on the slide. Thus, despite the simple construction, the delivery chute of the invention can infallibly send out components one by one.

The second embodiment, an improvement over the first embodiment, will now be described. In the first embodiment, when stopper 2 moves upward from the position in FIG. 3 to its upper position H, component 4 will slide down leftwardly of the stopper as in FIG. 4. Actually, as stopper 2 ascends, wiping against or sweeping past the end face of component 4, the friction tends to lift off the end of the component to some height. This can lead to deviation or jumping out of the component from the intended sliding course. The second embodiment solves this problem.

Referring to FIGS. 5 to 8, 1 and 2 are stoppers, 3 is a slide, and 4 and 5 are components being handled. Components 4, 5, and so forth are the same height, component 4 being the first one and component 5 the next.

Slide 3 consists of a high-floor section 3A and a low-floor section 3B bordered by a step 3C, which provides a difference in level less than the height of component 4.

Stopper 1 is located above slide 3, slightly downstream, or toward section 3B, away from step 3C. With a lower sideward extension 1A formed at its lower portion in parallel with slide section 3B, stopper 1 is vertically movable between a lower position E and an upper position F.

Lower position E is the lower limit for the vertical motion of stopper 1 where it stops a sufficient distance above slide section 3B to allow component 4 to slide down. With stopper 1 in this position, component 4 that has slid down on section 3A is brought to a stop by hitting against one side of the stopper.

Upper position F is the upper limit for stopper 1, where the stopper is kept still above the top of component 4.

Stopper 2 is also held above the section 3B of slide 3 a distance equal to the length L of component 4 downstream from step 3C. It is vertically movable too between a lower position G and an upper position H.

Lower position G is the lower limit for the motion of stopper 2, where it stops and causes component 4 on slide section 3B to stop upon contact with the stopper. Upper position H is the upper limit for stopper 2 to stop above the top of component 4 on section 3B.

The operation of this successive component delivery chute will be explained below with reference to FIGS. 5 to 8.

Figure 5:
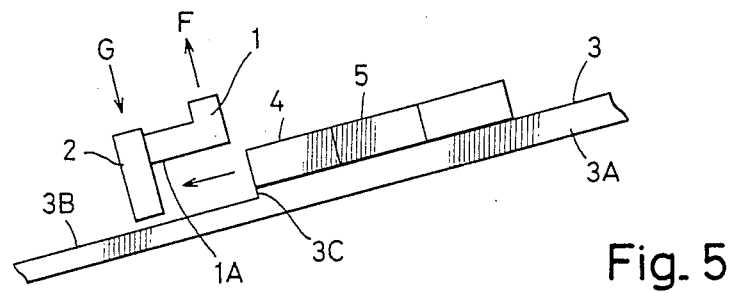
FIG. 5 is a schematic view showing the general construction of another embodiment of the invention.

FIG. 5 shows stopper 1 in its upper position F and stopper 2 in its lower position G.

In the state of FIG. 5, components 4, 5 slide down gravitationally toward slide section 3B.

Components 4, 5 may be moved otherwise than by gravity. For example, they may be delivered pneumatically or by other drive or forced feed means such as ratchet mechanism.

Figure 6:
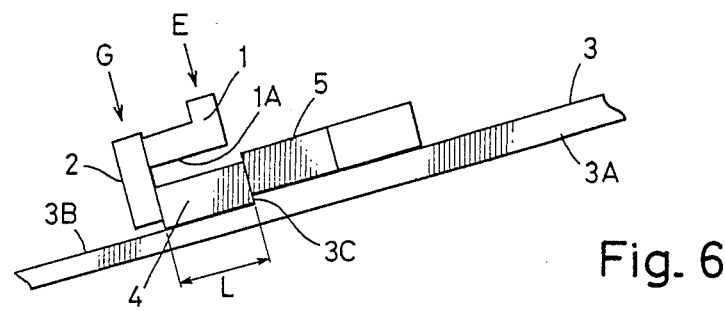
FIGS. 6 to 8 are sequential views explanatory of the operation of the second embodiment.

FIG. 6 illustrates an advanced stage in which component 4 in FIG. 5 has come to a stop upon contact with stopper 2, and component 5 at rest in contact with component 4, while stopper 1 is coming down to its lower position.

Figure 7:
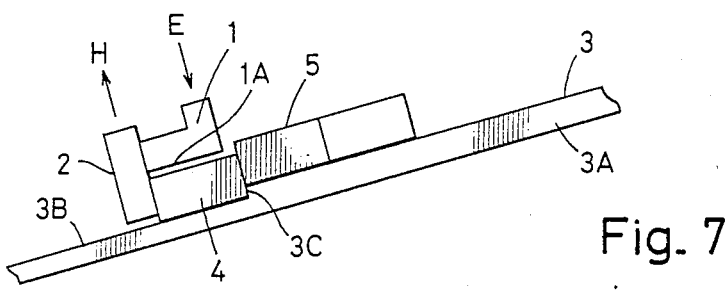

FIG. 7 shows stopper 2 moving upward from the position in FIG. 5 to its upper position H.

Figure 8:
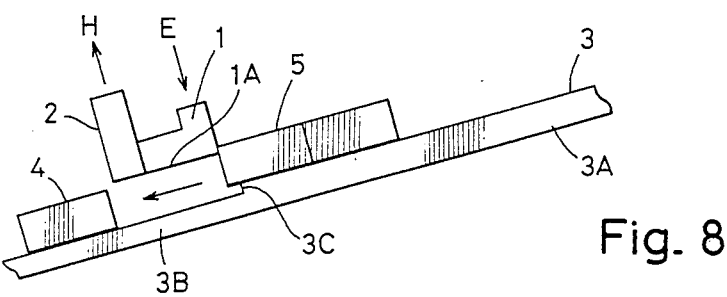

In FIG. 8, stopper 2 has ascended from the position in FIG. 6 to its upper position H, allowing component 4 to slide down to the left of stopper 2, whereas component 5 is kept still by one side of stopper 1.

When stopper 1 in FIG. 8 ascends to its upper position F and stopper 2 descends to its lower position G, the arrangement returns to the state of FIG. 5.

As is clear from FIGS. 5 to 8, components 4, 5, and so forth being discharged in a row are sent out, one by one, by the slide sections 3A, 3B in cooperation with the alternate vertical motions of stoppers 1, 2.

Turning to FIG. 8, component 4 in its downward sliding is guided by the lower sideward extension 1A of stopper 1. Consequently, there is no possibility of component 4 jumping off the slide or deviating from the intended chute direction.

If in FIG. 8 stopper 1 shifts to its upper position F and stopper 2 to its lower position G, then the arrangement will be the same as in FIG. 5.

Figure 9:
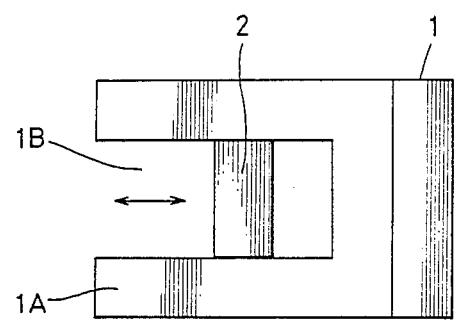
FIG. 9 is a plan view of the stoppers in still another embodiment of the invention.
Figure 10:
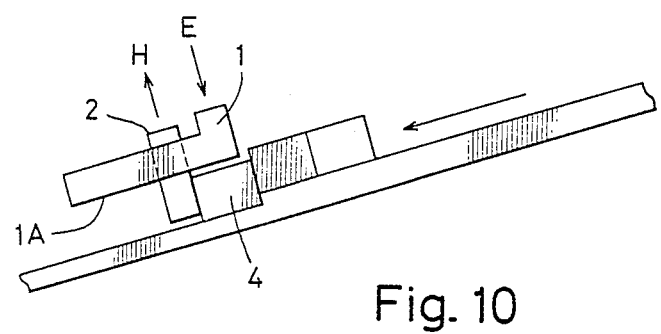
FIG. 10 is a schematic view showing the general construction of the third embodiment of the invention.

FIGS. 9 and 10 illustrate the third embodiment of the invention. The successive component delivery chute shown is aimed at an improvement of stopper 1 to permit free location adjustment of stopper 2. A problem common to the first and second embodiments is the necessity of adjusting the location of stopper 2 whenever components 4, 5, and so forth being handled are changed over to components of a different length L.

Referring now to FIG. 9, 1B is a slit formed in a lower sideward extension 1A of stopper 1. Stopper 2 is admitted to and is in contact with the slit 1B and is shiftable in position frontward and backward therein. The location of stopper 2 is so chosen as to stop component 4 where the component, depending on the length L of components 4, 5, and so forth, has come into place shown in FIG. 6.

FIG. 10 is a side view of the embodiment of FIG. 9. It shows that the successive component delivery chute of FIG. 10 can be used with components of varied lengths, by shifting the location of stopper 2, so as to accommodate the length L of component 4 within the slit 1B of stopper 1.

This embodiment, which uses stopper 1 having a lower sideward extension 1A formed with a slit 1B, makes possible easy adjustment of the location of stopper 2 to handle components in lots varying in length L.

What is claimed is:

1. A successive component delivery chute comprising a slide installed with an inclination which consists of a thin, or high-floor, section and a thin, or low-floor, section bordered by a step which provides a difference in level, or height, less than the thickness, or height, of the components to be handled, said low-floor section being on the downstream side, a first stopper located above the slide, slightly downstream, or toward the low-floor section, away from the step and which is vertically movable between a lower position, where the first stopper stops a sufficient distance above the low-floor section to allow each component thereon to slide down clear of the first stopper and where a component that has slid down on the high-floor section is brought to a stop by hitting against one side of the first stopper, and an upper position above the top of each component on the high-floor section, and a second stopper also held above the low-floor section of the slide but a distance equal to the length of the component downstream from the step and which is vertically movable between a lower position where the second stopper causes the component on the low-floor section to stop upon contact with the second stopper and an upper position above the top of each component on the low-floor section, said first stopper having a sideward extension formed integrally with the lower position thereof and extended into contact with said second, downstream stopper.

2. A successive component delivery chute comprising a slide installed with an inclination which consists of a thin, or high-floor, section and a thin, or low-floor, section bordered by a step which provides a difference in level, or height, less than the thickness, or height, of the components to be handled, said low-floor section being on the downstream side, a first stopper located above the slide, slightly downstream, or toward the low-floor section, away from the step, with a sideward extension formed integrally with the lower portion thereof and extended in parallel with the low-floor section, said first stopper being vertically movable between a lower position, where the first stopper stops a sufficient distance above the low-floor section to allow each component thereon to slide down clear of the first stopper and where a component that has slid down on the high-floor section is brought to a stop by hitting against one side of the first stopper, and an upper position above the top of each component on the high-floor section, and a second stopper also held above the low-floor section of the slide but a distance equal to the length of the component downstream from the step and which is vertically movable between a lower position where the second stopper causes the components on the low-floor section to stop upon contact with the second stopper and an upper position above the top of each component on the low-floor section, said sideward extension from the lower portion of the first stopper having a slit formed to receive said second stopper so that the second stopper can be located properly by moving frontward or backward within the slit, according to the length of the components to be handled.

* * * * *